(12) United States Patent
Evain et al.

(10) Patent No.: US 12,079,104 B2
(45) Date of Patent: Sep. 3, 2024

(54) INFRASTRUCTURE TO INTEGRATE AN INTEGRATED DEVELOPMENT ENVIRONMENT (IDE) WITH GAME ENGINES

(71) Applicant: Microsoft Technology Licensing, LLC, Redmond, WA (US)

(72) Inventors: Jean-Baptiste Pierre Jean Evain, Redmond, WA (US); John Robert Miller, Gettysburg, PA (US); Sebastien Gerard Lebreton, Cailloux sur Fontaines (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 17/568,581

(22) Filed: Jan. 4, 2022

(65) Prior Publication Data
US 2023/0214310 A1  Jul. 6, 2023

(51) Int. Cl.
*G06F 11/36* (2006.01)
*A63F 13/60* (2014.01)

(52) U.S. Cl.
CPC ............ *G06F 11/362* (2013.01); *A63F 13/60* (2014.09); *G06F 11/3688* (2013.01); *A63F 2300/6009* (2013.01)

(58) Field of Classification Search
CPC .... G06F 11/362; G06F 11/3688; A63F 13/60; A63F 13/6009
See application file for complete search history.

(56) References Cited

U.S. PATENT DOCUMENTS

| 7,904,877 | B2 * | 3/2011 | Multerer | G06F 8/71 717/136 |
| 9,463,386 | B1 * | 10/2016 | Chapman | A63F 13/69 |
| 2006/0174225 | A1 * | 8/2006 | Bennett | G06F 11/362 717/124 |

(Continued)

OTHER PUBLICATIONS

M. O. Ozcan, F. Odaci and I. Ari, "Remote Debugging for Containerized Applications in Edge Computing Environments," 2019, IEEE International Conference on Edge Computing (EDGE), 2019, pp. 30-32, doi: 10.1109/EDGE.2019.00021. (Year: 2019).*

(Continued)

*Primary Examiner* — Hanh Thi-Minh Bui
(74) *Attorney, Agent, or Firm* — Wade IP Law PLLC

(57) ABSTRACT

Techniques are described herein that are capable of integrating an IDE with game engines. States of the game engines are identified. Each state indicates whether the IDE enables a game developer to interact with the respective game engine and/or game(s) created by the respective game engine. A subset of the game engines is caused to be displayed to the game developer based at least in part on the IDE enabling the game developer to interact with each game engine in the subset and/or game(s) created by the respective game engine. A selection indicator, which indicates that a game engine is selected from the game engines in the subset, is received. An integration infrastructure, including a game engine-agnostic messaging protocol and game engine-agnostic messages, is provided. At least a portion of game code and/or test unit(s) are run and/or debugged using the IDE in a context of the selected game engine.

20 Claims, 6 Drawing Sheets

(56) References Cited

U.S. PATENT DOCUMENTS

2007/0087829 A1\* 4/2007 Liu .................... G07F 17/3276
463/42
2010/0083286 A1\* 4/2010 Herring .................. A63F 13/45
719/328

OTHER PUBLICATIONS

A. Datsuk, C. Wieden, D. A. Bulakh and T. Krupkina, "An Integrated Development Environment for Robust Interoperable PDK Implementation," 2021, IEEE Conference of Russian Young Researchers in Electrical and Electronic Engineering (EIConRus), pp. 2067-2071, doi: 10.1109/EIConRus51938.2021.9396695. (Year: 2021).\*
"How do I Debug two Android Devices Simultaneously in Eclipse?", Retrieved from: https://gamedev.stackexchange.com/questions/49416/how-do-i-debug-two-android-devices-simultaneously-in-eclipse, Feb. 15, 2013, 2 Pages.
"International Search Report and Written Opinion Issued in PCT Application No. PCT/US22/048119", Mailing Date: Feb. 2, 2023, 14 Pages.
Rhalibi, et al., "3D Java Web-Based Games Development and Deployment", In Proceedings of International Conference on Multimedia Computing and Systems, Apr. 2, 2009, 7 Pages.

\* cited by examiner

INFRASTRUCTURE TO INTEGRATE AN INTEGRATED DEVELOPMENT ENVIRONMENT (IDE) WITH GAME ENGINES

BACKGROUND

An integrated development environment (IDE) is an application that provides tools that are usable by software developers to develop software. For instance, the IDE may include a source code editor, build automation tools, a debugger, a compiler, and/or an interpreter.

A game engine is a software framework that provides tools that are usable by a game developer to develop a game (e.g., a computer game). For instance, the game engine may include libraries and/or support programs. A library may include configuration data, documentation, message templates, pre-written code, sub-routines, classes, types and values thereof, and/or help data.

An IDE sometimes is used as a companion to a game engine for development of games. For instance, development may start in the game engine, and the IDE may be opened to program behavior of the game. A game developer, a game engine creator, a middleware provider, or a third-party often tracks and maintains the relationship between the IDE and the game engine. If the IDE is to be used as a companion to a second game engine, tracking and maintaining a relationship with the second game engine typically requires duplicative efforts. For instance, the primitives that are used to track and maintain the relationship between the IDE and the first game engine typically are game engine-specific such that the primitives are not usable with other game engines. Accordingly, the primitives traditionally are rebuilt to be game engine-specific with regard to the second game engine to enable tracking and maintenance of the relationship between the IDE and the second game engine. The rebuilding of the primitives for the second game engine often results in the game developer having a different user experience with the IDE when using the IDE with the second game engine than when using the IDE with the first game engine.

SUMMARY

Various approaches are described herein for, among other things, integrating an integrated development environment (IDE) with game engines. An integration infrastructure is provided to enable integration of the IDE with the game engines. The integration infrastructure may include a game engine-agnostic messaging protocol, game engine-agnostic messages, game engine-specific messages, and/or application programming interfaces (APIs) (e.g., APIs of the IDE). A game-engine-agnostic messaging protocol is a protocol that enables bi-directional communication between an IDE and arbitrary game engines. For example, the game-engine-agnostic messaging protocol may enable each game engine to instantiate one or more (e.g., all) of the game engine-agnostic messages and/or one or more of the game engine-specific messages, send one or more of the game engine-agnostic messages and/or one or more of the game engine-specific messages to the IDE, and/or receive one or more of the game engine-agnostic messages and/or one or more of the game engine-specific messages from the IDE. In another example, the game-engine-agnostic messaging protocol may be based on (e.g., rely on or utilize) APIs of the IDE. In yet another example, the game-engine-agnostic messaging protocol may enable the bi-directional communication between the IDE and each game engine via a network-based protocol, such as user datagram protocol (UDP) and/or transmission control protocol (TCP), and/or named pipes (e.g., if the IDE and the respective game engine are on a common (e.g., same) computer). A message may include a command, a query, and/or data. For example, a command may be configured to locate a game over a network, start a game in a game engine, attach a debugger to a game, perform a debug operation with respect to a game, run a unit test to test a game, inform a game engine whether a game passed a unit test, or enable the IDE to identify a game engine. Attaching a debugger to a game may include defining break points in the game at which the debugger is configured to step through (e.g., halt) the running game. A game engine-agnostic message is a message that is usable by arbitrary game engines to interact with an IDE. A game engine-specific message is a message that is configured to be specific to a game engine and that is usable by the game engine to interact with an IDE. An API is a software interface that connects computers or software programs (e.g., applications or software frameworks). For instance, an API may connect an IDE to one or more game engines.

In an example approach, states of respective game engines are identified. Each state indicates whether an integrated development environment (IDE) enables a game developer to interact with the respective game engine and/or game(s) created by the respective game engine. A subset of the game engines is caused to be displayed to the game developer based at least in part on the IDE enabling the game developer to interact with each game engine in the subset and/or game(s) created by the respective game engine. The subset includes at least two of the game engines. A selection indicator is received. The selection indicator indicates that a game engine is selected from the game engines in the subset. An integration infrastructure is provided. The integration infrastructure includes a game engine-agnostic messaging protocol, which enables bi-directional communication between the IDE and each game engine in the subset, and further includes game engine-agnostic messages, which are usable by each game engine in the subset to interact with the IDE in accordance with the game engine-agnostic messaging protocol. A first operation and/or a second operation is performed. The first operation includes running and/or debugging at least a portion of game code using the IDE in a context of the selected game engine. The game code is code that defines a game. The second operation includes running and/or debugging unit test(s) using the IDE in the context of the selected game engine. The unit test(s) are configured to test at least a portion of the game code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodi- FIG. 1 is a block diagram of an example integration system in accordance with an embodiment.

Figure 1:
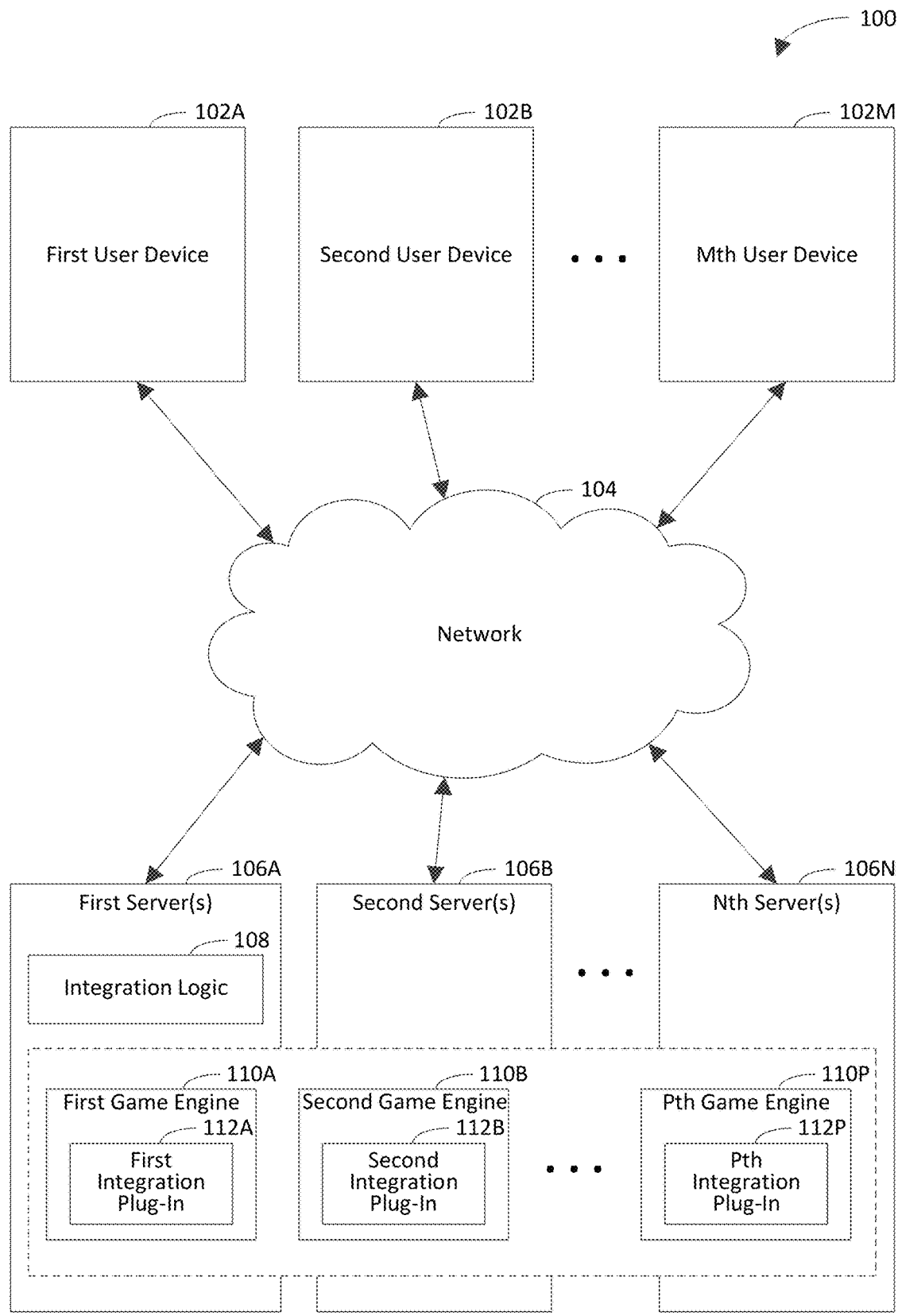

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", and "third" are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of integrating an integrated development environment (IDE) with game engines. An integration infrastructure is provided to enable integration of the IDE with the game engines. The integration infrastructure may include a game engine-agnostic messaging protocol, game engine-agnostic messages, game engine-specific messages, and/or application programming interfaces (APIs) (e.g., APIs of the IDE). A game-engine-agnostic messaging protocol is a protocol that enables bi-directional communication between an IDE and arbitrary game engines. For example, the game-engine-agnostic messaging protocol may enable each game engine to instantiate one or more (e.g., all) of the game engine-agnostic messages and/or one or more of the game engine-specific messages, send one or more of the game engine-agnostic messages and/or one or more of the game engine-specific messages to the IDE, and/or receive one or more of the game engine-agnostic messages and/or one or more of the game engine-specific messages from the IDE. In another example, the game-engine-agnostic messaging protocol may be based on (e.g., rely on or utilize) APIs of the IDE. In yet another example, the game-engine-agnostic messaging protocol may enable the bi-directional communication between the IDE and each game engine via a network-based protocol, such as user datagram protocol (UDP) and/or transmission control protocol (TCP), and/or named pipes (e.g., if the IDE and the respective game engine are on a common (e.g., same) computer). A message may include a command, a query, and/or data. For example, a command may be configured to locate a game over a network (e.g., so that the game may be displayed), start a game in a game engine, attach a debugger to a game, perform a debug operation with respect to a game, run a unit test to test a game, inform a game engine whether a game passed a unit test, or enable the IDE to identify a game engine. Attaching a debugger to a game may include defining break points in the game at which the debugger is configured to step through (e.g., halt) the running game. A game engine-agnostic message is a message that is usable by arbitrary game engines to interact with an IDE. A game engine-specific message is a message that is configured to be specific to a game engine and that is usable by the game engine to interact with an IDE. An API is a software interface that connects computers or software programs (e.g., applications or software frameworks). For instance, an API may connect an IDE to one or more game engines.

Example techniques described herein have a variety of benefits as compared to conventional techniques for integrating an IDE with a game engine. For instance, the example techniques may be capable of integrating an IDE with multiple game engines using a common (e.g., same) integration infrastructure (e.g., the same messaging protocol, at least some of the same messages, and/or at least some of the same APIs). For instance, the integration infrastructure may be reused for the various game engines to cause integration of the IDE with those game engines. Providers of respective game engines may utilize the integration infrastructure to generate respective plug-ins for the respective game engines, or the IDE may generate any one or more of the plug-ins automatically on behalf of the respective provider. The plug-ins may be loaded with the respective game engines to serve as respective agents of the IDE. Accordingly, the IDE and its agents (i.e., the plug-ins) may collaborate to integrate the IDE with the game engines that are loaded with the respective agents. The plug-ins may be provided to game developers to be used with the corresponding game engines. For instance, a first plug-in may be used with a first game engine; a second plug-in may be used with a second game engine, and so on. The IDE may provide messages to the plug-ins and receive messages from the plug-ins in accordance with a common messaging protocol, as defined by the integration infrastructure.

The example techniques may be capable of automating operations that traditionally are performed by a game developer during development of a game (e.g., causing a game engine to run the game, determining points at which a debugger is to be attached, and attaching the debugger using the IDE). For instance, the example embodiments may provide a one-click operation that causes multiple development operations to be performed. Any two or more of the development operations may be performed simultaneously or in a pre-defined order. For example, a debugger may be attached to a game simultaneously with a message being sent to the game engine to cause the game engine to start playing the game. The example techniques may be capable of debugging a game in a step-by-step manner without requiring assistance from the game developer.

The example techniques may automatically identify game engines with which an IDE is capable of being integrated. The example techniques may be capable of notifying a game developer of those game engines (e.g., without assistance from the game developer). The example techniques may automatically identify games (e.g., instances of a multi-player game) that are available for development. The example techniques may be capable of notifying a game developer of those games (e.g., without assistance from the game developer). For instance, the game developer need not necessarily manually select the games from a list of processes on computer(s) of the game developer, as conventional techniques may require. The example techniques may enable interaction between multiple instances of a multi-player game to be debugged.

The example techniques may increase efficiency, productivity, and/or a user experience of a game developer. For instance, the example techniques may enable the game developer to reuse primitives and knowledge regarding developer tools, rather than the game developer having to find different windows, different commands, or different names of the same command for each of the game engines.

The example techniques may provide a common user experience for game developers with regard to an IDE regardless which game engine the game developers use in collaboration with the IDE. For instance, regardless which game engine is being used in collaboration with the IDE, interface elements may be positioned in the same respective locations in a user interface and/or the same messages may be utilized to provide the same functionality. Examples of an interface element include but are not limited to a virtual button (e.g., a virtual button that is selectable to initiate debugging a game), a window (e.g., a window that includes an instance of a game), a widget, a text box, and a command line.

The example techniques may reduce an amount of time and/or resources (e.g., processor cycles, memory, network bandwidth) that is consumed to integrate an IDE with game engines. For instance, by providing an integration infrastructure that includes a game-agnostic protocol and game engine-agnostic messages, a computing system may conserve the time and resources that would have been consumed by the computing system to generate bespoke plug-ins for the various game engines to enable integration of the IDE with those game engines. By reducing the amount of time and/or resources that is consumed, the example techniques may increase an efficiency of the computing system that integrates the IDE with the game engines and/or reduce a cost associated with integrating the IDE with the game engines.

FIG. 1 is a block diagram of an example integration system 100 in accordance with an embodiment. Generally speaking, the integration system 100 operates to provide information to users in response to requests (e.g., hypertext transfer protocol (HTTP) requests) that are received from the users. The information may include documents (e.g., Web pages, images, audio files, and video files), output of executables, and/or any other suitable type of information. In accordance with example embodiments described herein, the integration system 100 integrates an integrated development environment (IDE) (e.g., including at least a portion of the integration logic 108) with a plurality of game engines 110A-110P. Detail regarding techniques for integrating an IDE with game engines is provided in the following discussion.

As shown in FIG. 1, the integration system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer or a personal digital assistant. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (e.g., Web pages, images, audio files, and video files), output of executables, or any other suitable type of information. In accordance with some example embodiments, the servers 106A-106N are configured to host respective Web sites, so that the Web sites are accessible to users of the integration system 100.

One example type of computer program that may be executed by one or more of the servers 106A-106N is a developer tool. A developer tool is a computer program that performs diagnostic operations (e.g., identifying the source of a problem, debugging, profiling, and controlling) with respect to program code and/or an API. Examples of a developer tool include a web development platform (e.g., Windows Azure Platform®, Amazon Web Services®, Google App Engine®, VMWare®, and Force.com®) and an integrated development environment (e.g., Microsoft Visual Studio®, IntelliJ®, Rider™, JDeveloper®, NetBeans®, and Eclipse Platform™). It will be recognized that the example techniques described herein may be implemented using a developer tool.

The game engines 110A-110P are shown to be distributed across the servers 106A-106N for illustrative purposes. Any one or more of the game engines 110A-110P may be hosted by any one or more of the servers 106A-106N. Examples of a game engine include but are not limited to the Unreal Engine® game engine, developed and distributed by Epic Games, Inc.; the Unity™ game engine, developed and distributed by Unity Software Inc. (dba Unity Technologies); and the Godot® game engine, developed and distributed by Software Freedom Conservancy, Inc. It should be noted that programmable games are deemed to be game engines. An example of a programmable game is the S&box® programmable game, which is developed and distributed by Facepunch Studios Ltd. The game engines 110A-110P include respective integration plug-ins 112A-112P. Each of the integration plug-ins 112A-112P serves as an agent of integration logic 108, which is described in further detail below. Accordingly, each of the integration plug-ins 112A-112P may be considered as a part of the integration logic 108. It will be recognized that operations performed by the plug-ins 112A-112P may be deemed to be performed by the integration logic 108.

The first server(s) 106A are shown to include the integration logic 108 for illustrative purposes. The integration logic 108 is configured to integrate an IDE with the game engines 110A-110P. The integration logic 108 may be partially or entirely incorporated in the IDE or another developer tool (e.g., a web development platform or another IDE), though the example embodiments are not limited in this respect. In an example implementation, the integration logic 108 identifies states of the respective game engines 110A-110P. Each state indicates whether the IDE enables a game developer to interact with the respective game engine and/or game(s) created by the respective game engine. The integration logic 108 causes a subset of the game engines 110A-110P to be displayed to the game developer (e.g., via one of the user devices 102A-102M) based at least in part on the IDE enabling the game developer to interact with each game engine in the subset and/or game(s) created by the respective game engine. The subset includes at least two of the game engines 110A-110P. The integration logic 108 receives a selection indicator, which indicates that a game engine is selected from the game engines in the subset. The integration logic 108 provides an integration infrastructure. The integration infrastructure includes at least a game engine-agnostic messaging protocol and game engine-agnostic messages. The game engine-agnostic messaging protocol enables bi-directional communication between the IDE and each game engine in the subset. The game engine-agnostic messages are usable by each game engine in the subset to interact with the IDE in accordance with the game engine-agnostic messaging protocol. The integration logic 108 performs a first operation and/or a second operation. The first operation includes running and/or debugging at least a portion of game code using the IDE in a context of the selected game engine. The game code is code that defines a game. The second operation includes running and/or debugging unit test(s) using the IDE in the context of the selected game engine. The unit test(s) are configured to test at least a portion of the game code.

The integration logic 108 may be implemented in various ways to integrate the IDE with the game engines 110A-110P, including being implemented in hardware, software, firmware, or any combination thereof. For example, the integration logic 108 may be implemented as computer program code configured to be executed in a processing system (e.g., one or more processors). In another example, at least a portion of the integration logic 108 may be implemented as hardware logic/electrical circuitry. For instance, at least a portion of the integration logic 108 may be implemented in a field-programmable gate array (FPGA), an application-specific integrated circuit (ASIC), an application-specific standard product (ASSP), a system-on-a-chip system (SoC), or a complex programmable logic device (CPLD). Each SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

The integration logic 108 is shown to be incorporated in the first server(s) 106A for illustrative purposes and is not intended to be limiting. It will be recognized that the integration logic 108 (or any portion(s) thereof) may be incorporated in any one or more of the user devices 102A-102M. For example, client-side aspects of the integration logic 108 may be incorporated in one or more of the user devices 102A-102M, and server-side aspects of integration logic 108 may be incorporated in the first server(s) 106A. In another example, the integration logic 108 may be distributed among the user devices 102A-102M. In yet another example, the integration logic 108 may be incorporated in a single one of the user devices 102A-102M. In another example, the integration logic 108 may be distributed among the server(s) 106A-106N. In still another example, the integration logic 108 may be incorporated in a single one of the servers 106A-106N.

Figure 2A:
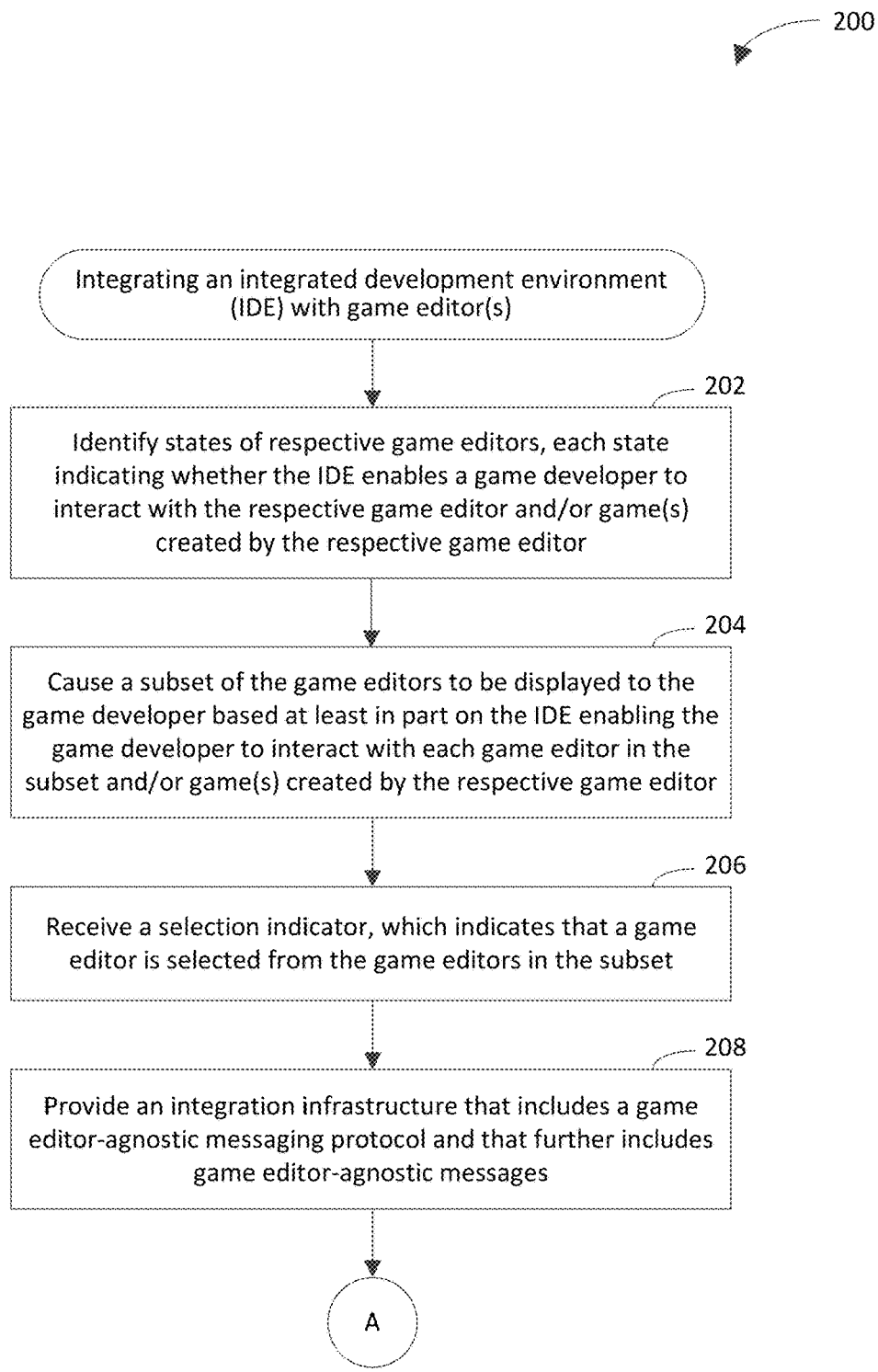
FIGS. 2A and 2B depict respective portions of a flowchart of an example method for integrating an integrated development environment (IDE) with game engines in accordance with an embodiment.
Figure 2B:
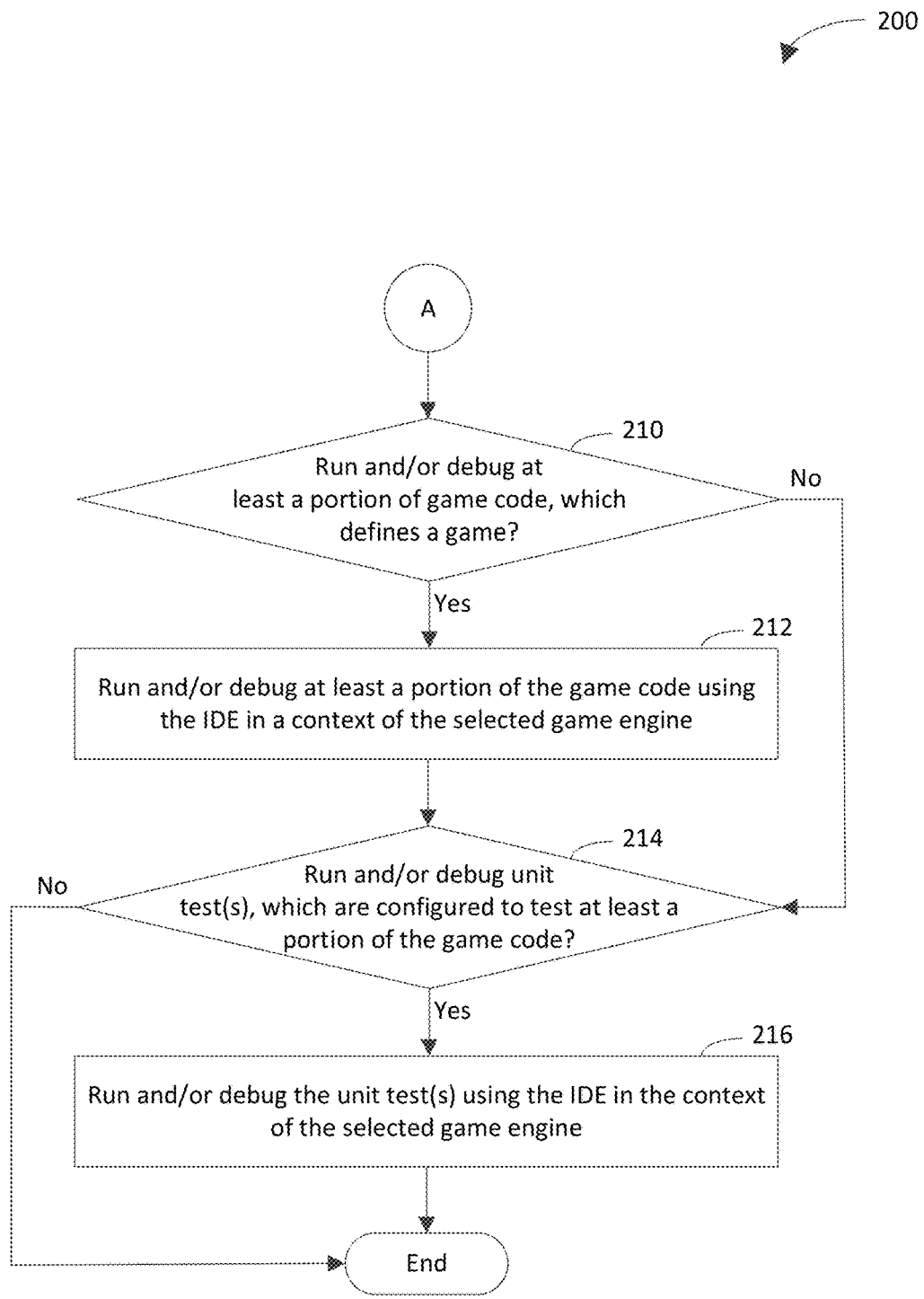
Figure 3:
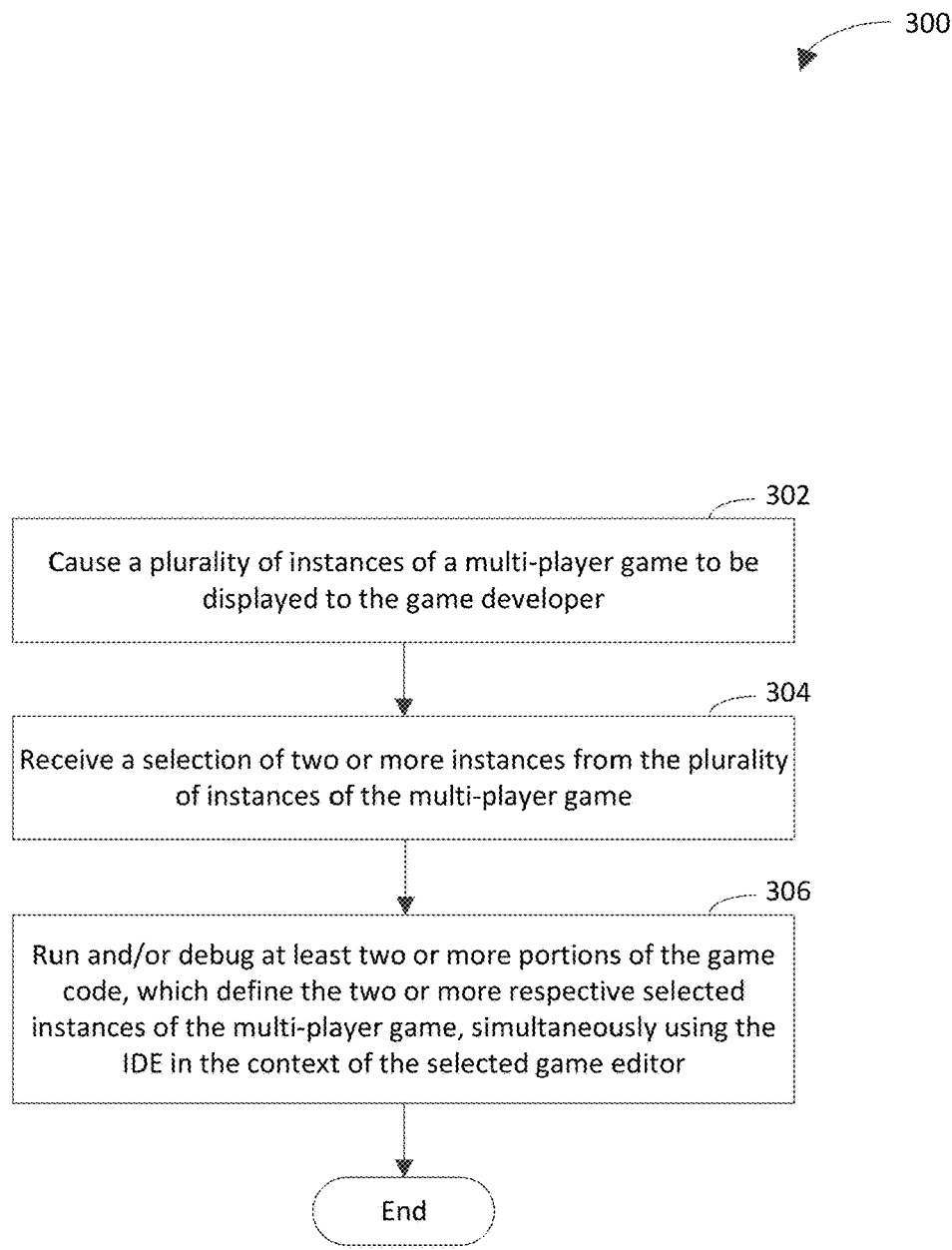
FIG. 3 depicts a flowchart of another example method for integrating an IDE with game engines in accordance with an embodiment.
Figure 4:
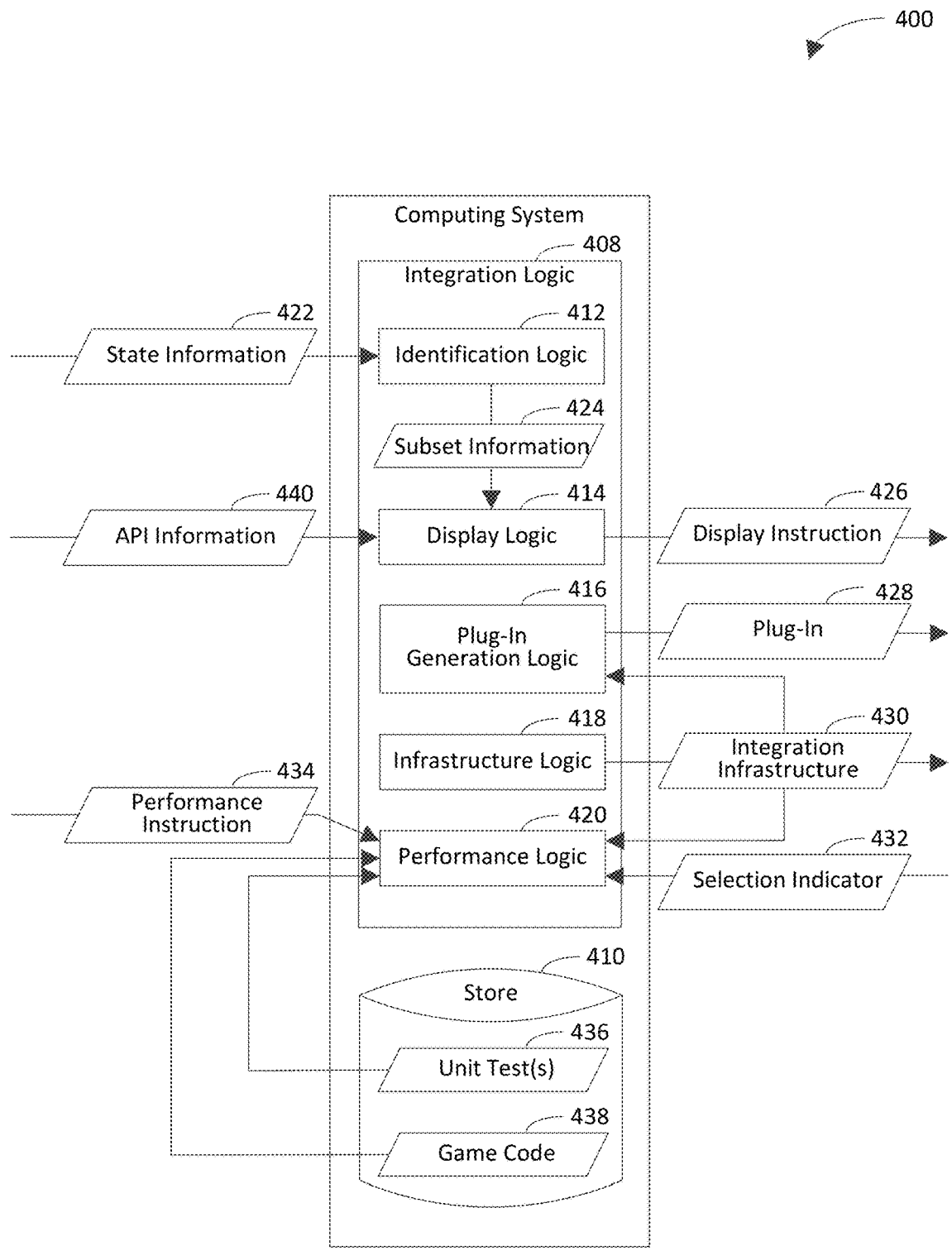
FIG. 4 is a block diagram of an example computing system in accordance with an embodiment.

FIGS. 2A and 2B depict respective portions of a flowchart 200 of an example method for integrating an integrated development environment (IDE) with game engines in accordance with an embodiment. FIG. 3 depicts a flowchart 300 of another example method for integrating an IDE with game engines in accordance with an embodiment. Flowcharts 200 and 300 may be performed by the first server(s) 106A, shown in FIG. 1, for example. For illustrative purposes, flowcharts 200 and 300 are described with respect to a computing system 400 shown in FIG. 4, which is an example implementation of the first server(s) 106A. As shown in FIG. 4, the computing system 400 includes integration logic 408 and a store 410. The integration logic 408 includes identification logic 412, display logic 414, plug-in generation logic 416, infrastructure logic 418, and performance logic 420. The store 410 may be any suitable type of store. One suitable type of store is a database. For instance, the store 410 may be a relational database, an entity-relationship database, an object database, an object relational database, or an extensible markup language (XML) database. The store 410 is shown to store unit test(s) 436 and game code 438 for illustrative purposes. Further structural and operational embodiments will be apparent to persons skilled in the relevant art(s) based on the discussion regarding flowcharts 200 and 300.

As shown in FIG. 2A, the method of flowchart 200 begins at step 202. In step 202, states of respective game engines are identified. Each state indicates whether the IDE enables a game developer to interact with the respective game engine and/or game(s) created by the respective game engine. For example, the state of each game engine may be based on any of a variety of factors, including but not limited to whether the game engine is running, whether the IDE is capable of communicating with the game engine, whether game(s) created by the game engine are running, and/or whether the IDE is capable of communicating with the game(s). In accordance with this example, a determination that a game engine is running and that the IDE is capable of communicating with the game engine may be a prerequisite for the IDE enabling a developer to interact with the game engine. Accordingly, a determination that a game engine is not running and/or that the IDE is not capable of communicating with the game engine may indicate that the IDE does not enable a developer to interact with the game engine. A determination that a game is running and that the IDE is capable of communicating with the game may be a prerequisite for the IDE enabling a developer to interact with the game. Accordingly, a determination that a game is not running and/or that the IDE is not capable of communicating with the game may indicate that the IDE does not enable a developer to interact with the game. The states may be represented by common extension points in the IDE.

In an example implementation, the identification logic 412 identifies the states of the respective game engines. For example, the identification logic 412 may receive state information 422, which indicates attributes of each game engine. In accordance with this example, the identification logic 412 may analyze the state information 422 to determine the attributes of each game engine. In further accordance with this example, the identification logic 412 may identify the state of each game engine based on the attributes of the respective game engine. The identification logic 412 may generate subset information 424 to indicate the states of the respective game engines.

At step 204, a subset of the game engines is caused to be displayed to the game developer based at least in part on the IDE enabling the game developer to interact with each game engine in the subset and/or game(s) created by the respective game engine. The subset includes at least two of the game engines. For example, by causing the subset of the game engines to be displayed to the game developer, efficiency of the integration process (and the computing system that performs the process) may be increased. In accordance with this example, the efficiency may be increased by focusing on only relevant game engines. In an example implementation, the display logic 414 causes the subset of the game engines to be displayed to the game developer. For instance, the display logic 414 may analyze the subset information 424 to determine the states of the respective game engines. For instance, the subset information 424 may indicate whether the IDE enables the game developer to interact with each game engine and/or enables the game developer to interact with game(s) created by the respective game engine. The display logic 414 may define the subset to include (e.g., consist of) each game engine with which the IDE enables the game developer to interact and each game engine that creates game(s) with which the IDE enables the game developer to interact. The display logic 414 may cause the subset of the game engines to be displayed to the game developer by sending a display instruction 426 to a computing device associated with the game developer. For instance, the display instruction 426 may include image pixels that define a visual representation of each game engine in the subset.

At step 206, a selection indicator is received. The selection indicator indicates that a game engine is selected from the game engines in the subset. In an example implementation, the performance logic 420 receives a selection indicator 432, which indicates that the game engine is selected.

At step 208, an integration infrastructure that includes a game engine-agnostic messaging protocol and game engine-agnostic messages is provided. The game engine-agnostic messaging protocol enables bi-directional communication between the IDE and each game engine in the subset. The game engine-agnostic messages are usable by each game engine in the subset to interact with the IDE in accordance with the game engine-agnostic messaging protocol. For instance, the game engine-agnostic messages may be generated by abstracting messages that are native to the game engines. In an example, providing the integration infrastructure may standardize the integration process and/or increase efficiency of the integration process because the integration infrastructure may be usable by all relevant game engines to integrate with the IDE. In an example implementation, the infrastructure logic 418 provides an integration infrastructure 430 that includes the game engine-agnostic messaging protocol and the game engine-agnostic messages.

In an example embodiment, the integration infrastructure enables each game engine producer that produces a game engine that is included in the subset to generate a plug-in for the respective game engine such that the plug-in enables the respective game engine to communicate with the IDE using the game engine-agnostic messaging protocol.

In another example embodiment, the integration infrastructure further includes at least one game engine-specific message. Each game engine-specific message is specific to the selected game engine (e.g., configured specifically for the selected game engine) and is usable by the selected game engine to interact with the IDE in accordance with the game engine-agnostic messaging protocol.

In yet another example embodiment, the integration infrastructure further includes at least one application programming interface (API) that is configured to transfer at least one of the game engine-agnostic messages between the IDE and the selected game engine in accordance with the game engine-agnostic messaging protocol.

In still another example embodiment, the integration infrastructure is configured to provide a common user experience associated with the IDE to the game developer for each game engine in the subset.

Flow continues to step 210, which is shown in FIG. 2B. At step 210, a determination is made whether at least a portion of game code is to be run and/or debugged. The game code defines a game. If at least a portion of the game code is to be run and/or debugged, flow continues to step 212. Otherwise, flow continues to step 214. In an example implementation, the performance logic 420 determines whether at least a portion of the game code 438 is to be run and/or debugged. For instance, the performance logic 420 may receive a performance instruction 434, which indicates that an operation is to be performed. The performance logic 420 may receive the performance instruction 434 from an agent of the IDE that executes on the selected game engine. The performance logic 420 may analyze the performance instruction 434 to determine whether the operation, which is indicated by the performance instruction 434, includes running and/or debugging at least a portion of the game code 438.

At step 212, at least a portion of the game code is run and/or debugged using the IDE in a context of the selected game engine. For example, at least a portion of the game code may be run and/or debugged using (e.g., by or in collaboration with) an agent of the IDE that runs in the selected game engine. In accordance with this example, the agent may run and/or debug at least a portion of the game code, or the agent may provide information (e.g., instructions and/or data) to the IDE to enable (e.g., cause) the IDE to run and/or debug at least a portion of the game code. In an example implementation, the performance logic 420 runs and/or debugs at least a portion of the game code 438. For instance, the performance logic 420 may run and/or debug at least a portion of the game code 438 based on the performance instruction 434 indicating that at least a portion of the game code 438 is to be run and/or debugged (e.g., based on the operation indicated by the performance instruction 434 including running and/or debugging at least a portion of the game code 438).

In an example embodiment, the game is a mobile game such that the game code is configured to run at least partially on a mobile device. In accordance with this embodiment, running and/or debugging at least a portion of the game code at step 212 includes running and/or debugging a server-side portion of the mobile game and a client-side portion of the mobile game simultaneously using the IDE in the context of the selected game engine. The server-side portion of the mobile game is configured to run on a server that is coupled to the mobile device via a network. The client-side portion of the mobile game is configured to run on the mobile device.

At step 214, a determination is made whether unit test(s) are to be run and/or debugged. The unit test(s) are configured to test at least a portion of the game code. If the unit test(s) are to be run and/or debugged, flow continues to step 216. Otherwise, flowchart 200 ends. In an example implementation, the operation logic 418 determines whether the unit test(s) are to be run and/or debugged. For instance, the performance logic 420 may receive the performance instruction 434, which indicates that an operation is to be performed. The performance logic 420 may analyze the performance instruction 434 to determine whether the operation includes running and/or debugging unit test(s) 436.

At step 216, the unit test(s) are run and/or debugged using the IDE in the context of the selected game engine. For example, the unit test(s) may be run and/or debugged using (e.g., by or in collaboration with) an agent of the IDE that runs in the selected game engine. In accordance with this example, the agent may run and/or debug the unit test(s), or the agent may provide information (e.g., instructions and/or data) to the IDE to enable (e.g., cause) the IDE to run and/or debug the unit test(s). In an example implementation, the performance logic 420 runs and/or debugs the unit test(s) 436. For instance, the performance logic 420 may run and/or debug the unit test(s) 436 based on the performance instruction 434 indicating that the unit test(s) 436 are to be run and/or debugged (e.g., based on the operation indicated by the performance instruction 434 including running and/or debugging the unit test(s) 436).

In some example embodiments, one or more steps 202, 204, 206, 208, 210, 212, 214, and/or 216 of flowchart 200 may not be performed. Moreover, steps in addition to or in lieu of steps 202, 204, 206, 208, 210, 212, 214, and/or 216 may be performed. For instance, in an example embodiment, the method of flowchart 200 further includes automatically generating a plug-in for the selected game engine such that the plug-in enables the selected game engine to communicate with the IDE using the game engine-agnostic messaging protocol. In an example implementation, the plug-in generation logic 416 generates a plug-in 428 for the selected game engine. In accordance with this implementation, the plug-in 428 enables the selected game engine to communicate with the IDE using the game engine-agnostic messaging protocol. The plug-in generation logic 416 may generate the plug-in 428 by using the integration infrastructure 430. For instance, the plug-in generation logic 416 may generate the plug-in 428 to include any suitable information from the integration infrastructure 430 (e.g., information regarding the game engine-agnostic messaging protocol, code that is configured to implement the game engine-agnostic messaging protocol, one or more of the game engine-agnostic messages, one or more game engine-specific messages, and/or one or more APIs). The information regarding the game engine-agnostic messaging protocol may describe how any of the game engine-agnostic message(s), the game engine-specific message(s), and/or the API(s) are to be used. The code that is configured to implement the game engine-agnostic messaging protocol may define operations that are to be performed using the game engine-agnostic message(s), the game engine-specific message(s), and/or the API(s).

In another example embodiment, the method of flowchart 200 further includes using an API of the IDE to cause a tooltip, including information regarding an API of the selected game engine, to be displayed in the IDE. For instance, the information regarding the API of the selected game engine may identify the API and describe functionality of the API (e.g., describe operations that the API is configured to perform in relation to the selected game engine). Causing the tooltip to be displayed in the IDE may eliminate a need for the game developer to search for the information (e.g., via an Internet search or by reviewing a website associated with the selected game engine). For example, the display logic 414 may use the API of the IDE to cause the tooltip to be displayed in the IDE. In accordance with this example, the display logic 414 may generate the display instruction 426 to include image pixels that define the tooltip.

In an aspect of this embodiment, the method of flowchart 200 further includes detecting that the game developer uses the API of the selected game engine in the game code. In accordance with this aspect, the API of the IDE may be used to cause the tooltip to be displayed based at least in part on detecting that the game developer uses the API of the selected game engine in the game code. For example, the display logic 414 may detect that the game developer uses the API of the selected game engine in the game code. In accordance with this example, the display logic 414 may receive API information 440, which indicates that the game developer uses the API of the selected game engine in the game code. In further accordance with this example, the display logic 414 may detect that the game developer uses the API of the selected game engine in the game code based at least in part on receipt of the API information 440.

In yet another example embodiment, the method of flowchart 200 further includes detecting that the game developer provides (e.g., types) a portion of a name of an API in the IDE. The portion of the name includes less than all of the name. For instance, detecting that the game developer provides the portion of the name may include detecting that the game developer begins to type the name. In an example, the display logic 414 may detect that the game developer provides the portion of the name of the API in the IDE. In accordance with this example, the display logic 414 may receive API information 440, which indicates that the game developer provides the portion of the name of the API in the IDE. In further accordance with this example, the display logic 414 may detect that the game developer provides the portion of the name of the API in the IDE based on receipt of the API information 440. In accordance with this embodiment, the method of flowchart 200 further includes causing a suggestion of one or more game engine-specific APIs, which are specific to the selected game engine, to be displayed to the game developer. The suggestion of the one or more game engine-specific APIs is based at least in part on the portion of the name of the API. For instance, the portion of the name may be shared by the one or more game engine-specific APIs. In an example, the display logic 414 may cause the suggestion of the one or more game engine-specific APIs to be displayed to the game developer. In accordance with this example, the display logic 414 may generate the display instruction 426 to include image pixels that represent the suggestion.

In still another example embodiment, the game is a multi-player game that includes multiple instances corresponding to respective players of the multi-player game. In accordance with this embodiment, step 212 is replaced with one or more of the steps shown in flowchart 300 of FIG. 3. As shown in FIG. 3, the method of flowchart 300 begins at step 302. In step 302, the instances of the multi-player game are caused to be displayed to the game developer. For example, the display logic 414 may generate a display instruction 426 that causes the instances of the multi-player game to be displayed to the game developer. In accordance with this example, the display instruction 426 may include image pixels that define a visual representation of each instance of the multi-player game.

At step 304, a selection of two or more instances from the instances of the multi-player game is received. For instance, the performance logic 420 may receive a selection indicator 432 that indicates the selection of the two or more instances.

At step 306, at least two or more portions of the game code, which define the two or more respective selected instances of the multi-player game, are run and/or debugged simultaneously using the IDE in the context of the selected game engine. For example, the performance logic 420 may run and/or debug at least the two or more portions of the game code simultaneously using the IDE in the context of the selected game engine.

It will be recognized that the computing system 400 may not include one or more of the integration logic 408, the store 410, the identification logic 412, the display logic 414, the plug-in generation logic 416, the infrastructure logic 418, and/or the performance logic 420. Furthermore, the computing system 400 may include components in addition to or in lieu of the integration logic 408, the store 410, the identification logic 412, the display logic 414, the plug-in generation logic 416, the infrastructure logic 418, and/or the performance logic 420.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the game engines 110A-110P, any one or more of the integration plug-ins 112A-112P, the integration logic 108, the integration logic 408, the identification logic 412, the display logic 414, the plug-in generation logic 416, the infrastructure logic 418, the performance logic 420, flowchart 200, and/or flowchart 300 may be implemented in hardware, software, firmware, or any combination thereof.

For example, any one or more of the game engines 110A-110P, any one or more of the integration plug-ins 112A-112P, the integration logic 108, the integration logic 408, the identification logic 412, the display logic 414, the plug-in generation logic 416, the infrastructure logic 418, the performance logic 420, flowchart 200, and/or flowchart 300 may be implemented, at least in part, as computer program code configured to be executed in a processing system.

In another example, any one or more of the game engines 110A-110P, any one or more of the integration plug-ins 112A-112P, the integration logic 108, the integration logic 408, the identification logic 412, the display logic 414, the plug-in generation logic 416, the infrastructure logic 418, the performance logic 420, flowchart 200, and/or flowchart 300 may be implemented, at least in part, as hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), and a complex programmable logic device (CPLD). For instance, a SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

Figure 5:
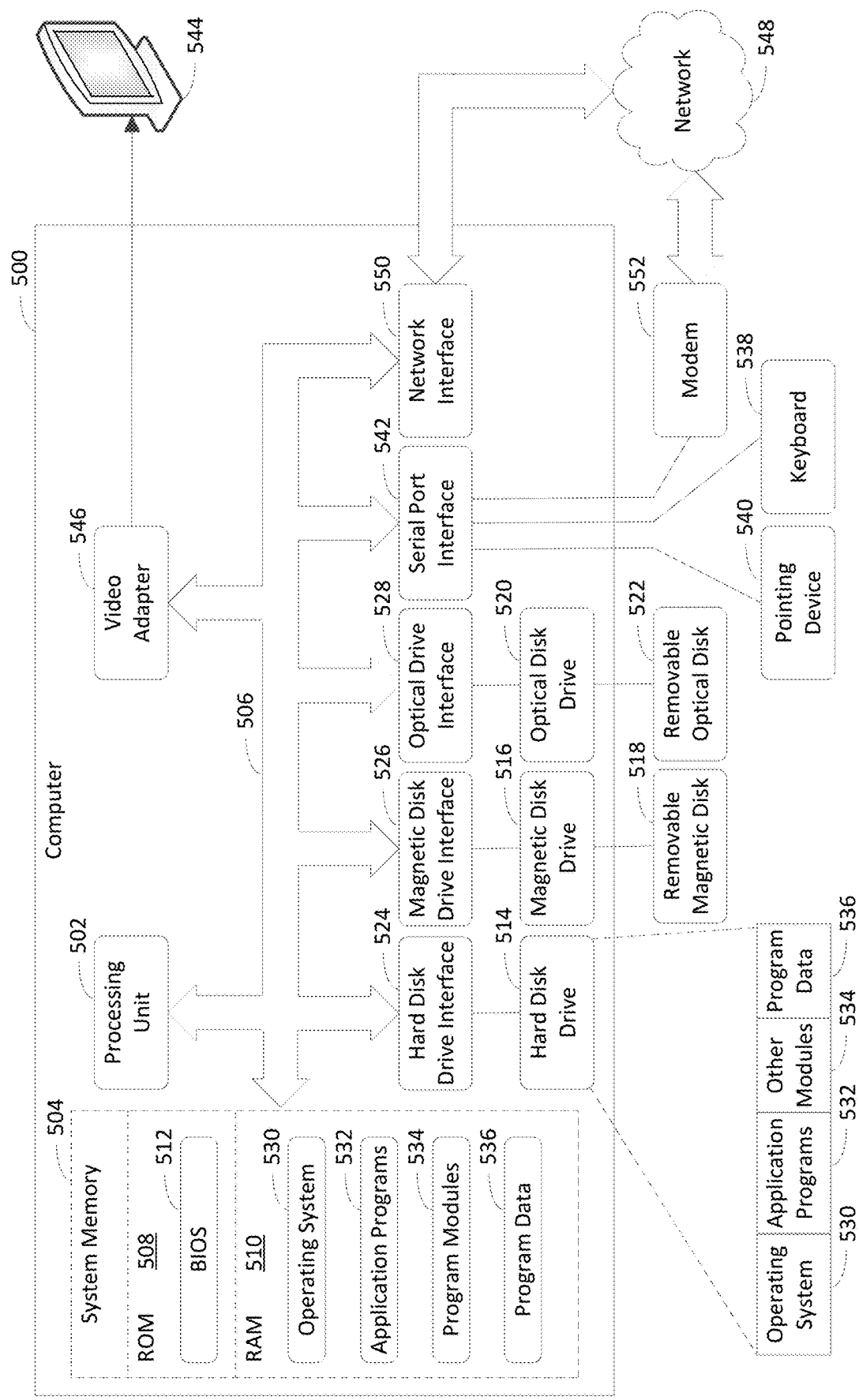
FIG. 5 depicts an example computer in which embodiments may be implemented.

III. Further Discussion of Some Example Embodiments (A1) An example system (FIG. 1, 102A-102M, 106A-106N; FIG. 4, 400; FIG. 5, 500) comprises a memory (FIG. 5, 504, 508, 510) and a processing system (FIG. 5, 502) coupled to the memory. The processing system is configured identify (FIG. 2, 202) a plurality of states of a plurality of respective game engines. Each state indicates whether an integrated development environment (IDE) enables a game developer to interact with at least one of the respective game engine or one or more games created by the respective game engine. The processing system is further configured to cause (FIG. 2, 204) a subset of the plurality of game engines to be displayed to the game developer based at least in part on the IDE enabling the game developer to interact with at least one of each game engine in the subset or one or more games created by the respective game engine. The subset includes at least two of the game engines. The processing system is further configured to receive (FIG. 2, 206) a selection indicator, which indicates that a game engine is selected from the game engines in the subset. The processing system is further configured to provide (FIG. 2, 208) an integration infrastructure (FIG. 4, 430) that includes a game engine-agnostic messaging protocol, which enables bi-directional communication between the IDE and each game engine in the subset, and that further includes a plurality of game engine-agnostic messages, which are usable by each game engine in the subset to interact with the IDE in accordance with the game engine-agnostic messaging protocol. The processing system is further configured to perform at least one of the following: at least one of run or debug (FIG. 2, 212) at least a portion of game code (FIG. 4, 438), which defines a game, using the IDE in a context of the selected game engine; or at least one of run or debug (FIG. 2, 216) one or more unit tests (FIG. 4, 436), which are configured to test at least a portion of the game code, using the IDE in the context of the selected game engine.

(A2) In the system of A1, wherein the integration infrastructure enables each game engine producer that produces a game engine that is included in the subset to generate a plug-in for the respective game engine such that the plug-in enables the respective game engine to communicate with the IDE using the game engine-agnostic messaging protocol.

(A3) In the system of any of A1-A2, wherein the processing system is further configured to: automatically generate a plug-in for the selected game engine such that the plug-in enables the selected game engine to communicate with the IDE using the game engine-agnostic messaging protocol.

(A4) In the system of any of A1-A3, wherein the processing system is configured to: provide the integration infrastructure that further includes at least one game engine-specific message, which is specific to the selected game engine and which is usable by the selected game engine to interact with the IDE in accordance with the game engine-agnostic messaging protocol.

(A5) In the system of any of A1-A4, wherein the processing system is configured to: provide the integration infrastructure that further includes at least one application programming interface (API) that is configured to transfer at least one of the plurality of game engine-agnostic messages between the IDE and the selected game engine in accordance with the game engine-agnostic messaging protocol.

(A6) In the system of any of A1-A5, wherein the game is a multi-player game that includes a plurality of instances corresponding to a plurality of respective players of the multi-player game; and wherein the processing system is configured to: cause the plurality of instances of the multi-player game to be displayed to the game developer; and based at least in part on receipt of a selection of two or more instances from the plurality of instances of the multi-player game, at least one of run or debug at least two or more portions of the game code, which define the two or more respective selected instances of the multi-player game, simultaneously using the IDE in the context of the selected game engine.

(A7) In the system of any of A1-A6, wherein the game is a mobile game such that the game code is configured to run at least partially on a mobile device; and wherein the processing system is configured to: at least one of run or debug a server-side portion of the mobile game, which is configured to run on a server that is coupled to the mobile device via a network, and a client-side portion of the mobile game, which is configured to run on the mobile device, simultaneously using the IDE in the context of the selected game engine.

(A8) In the system of any of A1-A7, wherein the integration infrastructure is configured to provide a common user experience associated with the IDE to the game developer for each game engine in the subset.

(A9) In the system of any of A1-A8, wherein the processing system is further configured to: use an application programming interface (API) of the IDE to cause a tooltip, including information regarding an API of the selected game engine, to be displayed in the IDE.

(A10) In the system of any of A1-A9, wherein the processing system is further configured to: detect that the game developer provides a portion of a name of an application programming interface (API) in the IDE; and cause a suggestion of one or more game engine-specific APIs, which are specific to the selected game engine, to be displayed to the game developer, wherein the suggestion of the one or more game engine-specific APIs is based at least in part on the portion of the name of the API.

(B1) An example method, which is implemented by a computing system (FIG. 1, 102A-102M, 106A-106N; FIG. 4, 400; FIG. 5, 500), comprises identifying (FIG. 2, 202) a plurality of states of a plurality of respective game engines, each state indicating whether an integrated development environment (IDE) enables a game developer to interact with at least one of the respective game engine or one or more games created by the respective game engine. The example method further comprises causing (FIG. 2, 204) a subset of the plurality of game engines to be displayed to the game developer based at least in part on the IDE enabling the game developer to interact with at least one of each game engine in the subset or one or more games created by the respective game engine. The subset includes at least two of the game engines. The example method further comprises receiving (FIG. 2, 206) a selection indicator, which indicates that a game engine is selected from the game engines in the subset. The example method further comprises providing (FIG. 2, 208) an integration infrastructure (FIG. 4, 430) that includes a game engine-agnostic messaging protocol, which enables bi-directional communication between the IDE and each game engine in the subset, and that further includes a plurality of game engine-agnostic messages, which are usable by each game engine in the subset to interact with the IDE in accordance with the game engine-agnostic messaging protocol. The example method further comprises performing at least one of the following: at least one of running or debugging (FIG. 2, 212) at least a portion of game code (FIG. 4, 438), which defines a game, using the IDE in a context of the selected game engine; or at least one of running or debugging (FIG. 2, 214) one or more unit tests (FIG. 4, 436), which are configured to test at least a portion of the game code, using the IDE in the context of the selected game engine.

(B2) In the method of B1, wherein the integration infrastructure enables each game engine producer that produces a game engine that is included in the subset to generate a plug-in for the respective game engine such that the plug-in enables the respective game engine to communicate with the IDE using the game engine-agnostic messaging protocol.

(B3) In the method of any of B1-B2, further comprising: automatically generating a plug-in for the selected game engine such that the plug-in enables the selected game engine to communicate with the IDE using the game engine-agnostic messaging protocol.

(B4) In the method of any of B1-B3, wherein providing the integration infrastructure comprises: providing the integration infrastructure that further includes at least one game engine-specific message, which is specific to the selected game engine and which is usable by the selected game engine to interact with the IDE in accordance with the game engine-agnostic messaging protocol.

(B5) In the method of any of B1-B4, wherein providing the integration infrastructure comprises: providing the integration infrastructure that further includes at least one application programming interface (API) that is configured to transfer at least one of the plurality of game engine-agnostic messages between the IDE and the selected game engine in accordance with the game engine-agnostic messaging protocol.

(B6) In the method of any of B1-B5, wherein the game is a multi-player game that includes a plurality of instances corresponding to a plurality of respective players of the multi-player game; and wherein the method comprises: causing the plurality of instances of the multi-player game to be displayed to the game developer; receiving a selection of two or more instances from the plurality of instances of the multi-player game; and at least one of running or debugging at least two or more portions of the game code, which define the two or more respective selected instances of the multi-player game, simultaneously using the IDE in the context of the selected game engine.

(B7) In the method of any of B1-B6, wherein the game is a mobile game such that the game code is configured to run at least partially on a mobile device; and wherein the method comprises: at least one of running or debugging a server-side portion of the mobile game, which is configured to run on a server that is coupled to the mobile device via a network, and a client-side portion of the mobile game, which is configured to run on the mobile device, simultaneously using the IDE in the context of the selected game engine.

(B8) In the method of any of B1-B7, wherein the integration infrastructure is configured to provide a common user experience associated with the IDE to the game developer for each game engine in the subset.

(B9) In the method of any of B1-B8, further comprising: using an application programming interface (API) of the IDE to cause a tooltip, including information regarding an API of the selected game engine, to be displayed in the IDE.

(B10) In the method of any of B1-B9, further comprising: detecting that the game developer provides a portion of a name of an application programming interface (API) in the IDE; and causing a suggestion of one or more game engine-specific APIs, which are specific to the selected game engine, to be displayed to the game developer, wherein the suggestion of the one or more game engine-specific APIs is based at least in part on the portion of the name of the API.

(C1) An example computer program product (FIG. 5, 518, 522) comprising a computer-readable storage medium having instructions recorded thereon for enabling a processor-based system (FIG. 1, 102A-102M, 106A-106N; FIG. 4, 400; FIG. 5, 500) to perform operations. The operations comprise identifying (FIG. 2, 202) a plurality of states of a plurality of respective game engines, each state indicating whether an integrated development environment (IDE) enables a game developer to interact with at least one of the respective game engine or one or more games created by the respective game engine. The operations further comprise causing (FIG. 2, 204) a subset of the plurality of game engines to be displayed to the game developer based at least in part on the IDE enabling the game developer to interact with at least one of each game engine in the subset or one or more games created by the respective game engine. The subset includes at least two of the game engines. The operations further comprise receiving (FIG. 2, 206) a selection indicator, which indicates that a game engine is selected from the game engines in the subset. The operations further comprise providing (FIG. 2, 208) an integration infrastructure (FIG. 4, 430) that includes a game engine-agnostic messaging protocol, which enables bi-directional communication between the IDE and each game engine in the subset, and that further includes a plurality of game engine-agnostic messages, which are usable by each game engine in the subset to interact with the IDE in accordance with the game engine-agnostic messaging protocol. The operations further comprise performing at least one of the following: at least one of running or debugging (FIG. 2, 212) at least a portion of game code (FIG. 4, 438), which defines a game, using the IDE in a context of the selected game engine; or at least one of running or debugging (FIG. 2, 214) one or more unit tests (FIG. 4, 436), which are configured to test at least a portion of the game code, using the IDE in the context of the selected game engine.

(C2) In the computer program product of C1, wherein the integration infrastructure enables each game engine producer that produces a game engine that is included in the subset to generate a plug-in for the respective game engine such that the plug-in enables the respective game engine to communicate with the IDE using the game engine-agnostic messaging protocol.

(C3) In the computer program product of any of C1-C2, wherein the operations further comprise: automatically generating a plug-in for the selected game engine such that the plug-in enables the selected game engine to communicate with the IDE using the game engine-agnostic messaging protocol.

(C4) In the computer program product of any of C1-C3, wherein the operations comprise: providing the integration infrastructure that further includes at least one game engine-specific message, which is specific to the selected game engine and which is usable by the selected game engine to interact with the IDE in accordance with the game engine-agnostic messaging protocol.

IV. Example Computer System

FIG. 5 depicts an example computer 500 in which embodiments may be implemented. Any one or more of the user devices 102A-102M and/or any one or more of the servers 106A-106N shown in FIG. 1 and/or the computing system 400 shown in FIG. 4 may be implemented using computer 500, including one or more features of computer 500 and/or alternative features. Computer 500 may be a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processing unit 502, a system memory 504, and a bus 506 that couples various system components including system memory 504 to processing unit 502. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 530, one or more application programs 532, other program modules 534, and program data 536. Application programs 532 or program modules 534 may include, for example, computer program logic for implementing any one or more of (e.g., at least a portion of) the game engines 110A-110P, any one or more of the integration plug-ins 112A-112P, the integration logic 108, the integration logic 408, the identification logic 412, the display logic 414, the plug-in generation logic 416, the infrastructure logic 418, the performance logic 420, flowchart 200 (including any step of flowchart 200), and/or flowchart 300 (including any step of flowchart 300), as described herein.

A user may enter commands and information into the computer 500 through input devices such as keyboard 538 and pointing device 540. Other input devices (not shown) may include a microphone, joystick, game pad, satellite dish, scanner, touch screen, camera, accelerometer, gyroscope, or the like. These and other input devices are often connected to the processing unit 502 through a serial port interface 542 that is coupled to bus 506, but may be connected by other interfaces, such as a parallel port, game port, or a universal serial bus (USB).

A display device 544 (e.g., a monitor) is also connected to bus 506 via an interface, such as a video adapter 546. In addition to display device 544, computer 500 may include other peripheral output devices (not shown) such as speakers and printers.

Computer 500 is connected to a network 548 (e.g., the Internet) through a network interface or adapter 550, a modem 552, or other means for establishing communications over the network. Modem 552, which may be internal or external, is connected to bus 506 via serial port interface 542.

As used herein, the terms "computer program medium" and "computer-readable storage medium" are used to generally refer to media (e.g., non-transitory media) such as the hard disk associated with hard disk drive 514, removable magnetic disk 518, removable optical disk 522, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a memory; and
a processing system coupled to the memory, the processing system configured to:
identify a plurality of states of a plurality of game engines, the plurality of states indicating whether an integrated development environment (IDE) enables a game developer to interact with respective game engines of the plurality of game engines or games created by the respective game engines;

cause at least two game engines of the plurality of game engines to be displayed to the game developer based at least in part on the IDE enabling the game developer to interact with the at least two game engines or games created by the at least two game engines;

receive a selection indicator, which indicates that a game engine is selected from the at least two game engines;

provide an integration infrastructure that includes a game engine-agnostic messaging protocol, which enables bi-directional communication between the IDE and the at least two game engines, and that further includes a plurality of game engine-agnostic messages, which are usable by the at least two game engines to interact with the IDE in accordance with the game engine-agnostic messaging protocol;

detect that the game developer provides a portion of a name of an application programming interface (API) in the IDE;

cause a suggestion of a game engine-specific API, which is specific to the game engine that is selected from the at least two game engines, to be displayed to the game developer, wherein the suggestion of the game engine-specific API is based at least in part on the portion of the name of the API; and perform at least one of the following:
 at least one of run or debug at least a portion of game code, which defines a game, using the IDE in a context of the game engine that is selected from the at least two game engines; or
 at least one of run or debug a unit test, which is configured to test at least a portion of the game code, using the IDE in the context of the game engine that is selected from the at least two game engines.

2. The system of claim 1, wherein the integration infrastructure enables a game engine producer that produces a designated game engine of the at least two game engines to generate a plug-in for the designated game engine such that the plug-in enables the designated game engine to communicate with the IDE using the game engine-agnostic messaging protocol.

3. The system of claim 1, wherein the processing system is further configured to:
 automatically generate a plug-in for the game engine that is selected from the at least two game engines such that the plug-in enables the game engine that is selected from the at least two game engines to communicate with the IDE using the game engine-agnostic messaging protocol.

4. The system of claim 1, wherein the processing system is configured to:
 provide the integration infrastructure that further includes a game engine-specific message, which is specific to the game engine that is selected from the at least two game engines and which is usable by the game engine that is selected from the at least two game engines to interact with the IDE in accordance with the game engine-agnostic messaging protocol.

5. The system of claim 1, wherein the processing system is configured to:
 provide the integration infrastructure that further includes an application programming interface (API) that is configured to transfer a game engine-agnostic message of the plurality of game engine-agnostic messages between the IDE and the selected game engine in accordance with the game engine-agnostic messaging protocol.

6. The system of claim 1, wherein the game is a multi-player game that includes a plurality of instances corresponding to a plurality of respective players of the multi-player game; and
 wherein the processing system is configured to:
  cause the plurality of instances of the multi-player game to be displayed to the game developer; and
  based at least in part on receipt of a selection of two or more instances from the plurality of instances of the multi-player game, at least one of run or debug at least two or more portions of the game code, which define the two or more instances of the multi-player game that are selected from the plurality of instances of the multi-player game, simultaneously using the IDE in the context of the game engine that is selected from the at least two game engines.

7. The system of claim 1, wherein the game is a mobile game such that the game code is configured to run at least partially on a mobile device; and
 wherein the processing system is configured to:
  at least one of run or debug a server-side portion of the mobile game, which is configured to run on a server that is coupled to the mobile device via a network, and a client-side portion of the mobile game, which is configured to run on the mobile device, simultaneously using the IDE in the context of the selected game engine.

8. The system of claim 1, wherein the integration infrastructure is configured to provide a common user experience associated with the IDE to the game developer for the at least two game engines.

9. The system of claim 1, wherein the processing system is further configured to:
 use an application programming interface (API) of the IDE to cause a tooltip, including information regarding an API of the game engine that is selected from the at least two game engines, to be displayed in the IDE.

10. The system of claim 1, wherein the plurality of game engine-agnostic commands includes a game engine-agnostic command that is usable by the at least two game engines to perform at least one of the following operations:
 locate an identified game over a network;
 start the identified game in an identified game engine of the at least two game engines; or
 attach a debugger to the identified game.

11. The system of claim 1, wherein the plurality of game engine-agnostic commands includes a game engine-agnostic command that is usable by the at least two game engines to perform at least one of the following operations:
 perform a debug operation with respect to an identified game;
 run a unit test to test the identified game;
 inform the identified game engine whether the identified game passed the unit test; or
 enable the IDE to identify the identified game engine.

12. A method, which is implemented by a computing system, comprising:
 identifying a plurality of states of a plurality of game engines, the plurality of states indicating whether an integrated development environment (IDE) enables a game developer to interact with respective game engines of the plurality of game engines or games created by the respective game engines;

causing at least two game engines of the plurality of game engines to be displayed to the game developer based at least in part on the IDE enabling the game developer to interact with the at least two game engines or games created by the at least two game engines;

receiving a selection indicator, which indicates that a game engine is selected from the at least two game engines;

providing an integration infrastructure that includes a game engine-agnostic messaging protocol, which enables bi-directional communication between the IDE and the at least two game engines, and that further includes a plurality of game engine-agnostic messages, which are usable by the at least two game engines to interact with the IDE in accordance with the game engine-agnostic messaging protocol;

detecting that the game developer provides a portion of a name of an application programming interface (API) in the IDE;

causing a suggestion of a game engine-specific API, which is specific to the game engine that is selected from the at least two game engines, to be displayed to the game developer, wherein the suggestion of the game engine-specific API is based at least in part on the portion of the name of the API; and performing at least one of the following:
   at least one of running or debugging at least a portion of game code, which defines a game, using the IDE in a context of the game engine that is selected from the at least two game engines; or
   at least one of running or debugging a unit test, which is configured to test at least a portion of the game code, using the IDE in the context of the game engine that is selected from the at least two game engines.

13. The method of claim 12, wherein the integration infrastructure enables a game engine producer that produces a designated game engine of the at least two game engines to generate a plug-in for the designated game engine such that the plug-in enables the designated game engine to communicate with the IDE using the game engine-agnostic messaging protocol.

14. The method of claim 12, further comprising:
automatically generating a plug-in for the game engine that is selected from the at least two game engines such that the plug-in enables the game engine that is selected from the at least two game engines to communicate with the IDE using the game engine-agnostic messaging protocol.

15. The method of claim 12, wherein providing the integration infrastructure comprises:
providing the integration infrastructure that further includes a game engine-specific message, which is specific to the game engine that is selected from the at least two game engines and which is usable by the game engine that is selected from the at least two game engines to interact with the IDE in accordance with the game engine-agnostic messaging protocol.

16. The method of claim 12, wherein providing the integration infrastructure comprises:
providing the integration infrastructure that further includes an application programming interface (API) that is configured to transfer a game engine-agnostic message of the plurality of game engine-agnostic messages between the IDE and the selected game engine in accordance with the game engine-agnostic messaging protocol.

17. The method of claim 12, wherein the game is a multi-player game that includes a plurality of instances corresponding to a plurality of respective players of the multi-player game; and
wherein the method comprises:
   causing the plurality of instances of the multi-player game to be displayed to the game developer;
   receiving a selection of two or more instances from the plurality of instances of the multi-player game; and
   at least one of running or debugging at least two or more portions of the game code, which define the two or more instances of the multi-player game that are selected from the plurality of instances of the multi-player game, simultaneously using the IDE in the context of the game engine that is selected from the at least two game engines.

18. The method of claim 12, wherein the game is a mobile game such that the game code is configured to run at least partially on a mobile device; and
wherein the method comprises:
   at least one of running or debugging a server-side portion of the mobile game, which is configured to run on a server that is coupled to the mobile device via a network, and a client-side portion of the mobile game, which is configured to run on the mobile device, simultaneously using the IDE in the context of the selected game engine.

19. The method of claim 12, further comprising:
using an application programming interface (API) of the IDE to cause a tooltip, including information regarding an API of the game engine that is selected from the at least two game engines, to be displayed in the IDE.

20. A computer program product comprising a computer-readable storage medium having instructions recorded thereon for enabling a processor-based system to perform operations, the operations comprising:
identifying a plurality of states of a plurality of game engines, the plurality of states indicating whether an integrated development environment (IDE) enables a game developer to interact with respective game engines of the plurality of game engines or games created by the respective game engines;

causing at least two game engines of the plurality of game engines to be displayed to the game developer based at least in part on the IDE enabling the game developer to interact with the at least two game engines or games created by the at least two game engines;

receiving a selection indicator, which indicates that a game engine is selected from the at least two game engines;

providing an integration infrastructure that includes a game engine-agnostic messaging protocol, which enables bi-directional communication between the IDE and the at least two game engines, and that further includes a plurality of game engine-agnostic messages, which are usable by the at least two game engines to interact with the IDE in accordance with the game engine-agnostic messaging protocol;

detecting that the game developer provides a portion of a name of an application programming interface (API) in the IDE;

causing a suggestion of a game engine-specific API, which is specific to the game engine that is selected from the at least two game engines, to be displayed to the game developer, wherein the suggestion of the game engine-specific API is based at least in part on the portion of the name of the API; and performing at least one of the following:
- at least one of running or debugging at least a portion of game code, which defines a game, using the IDE in a context of the game engine that is selected from the at least two game engines; or
- at least one of running or debugging a unit test, which is configured to test at least a portion of the game code, using the IDE in the context of the game engine that is selected from the at least two game engines.

* * * * *